US011857967B2

(12) United States Patent
DeVoe et al.

(10) Patent No.: US 11,857,967 B2
(45) Date of Patent: Jan. 2, 2024

(54) INTEGRATION OF POROUS MONOLITHIC STRUCTURES WITHIN MICROFLUIDIC SYSTEMS

(71) Applicant: University of Maryland, College Park, College Park, MD (US)

(72) Inventors: Donald Lad DeVoe, Bethesda, MD (US); Jung Yeon Han, College Park, MD (US)

(73) Assignee: UNIVERSITY OF MARYLAND, COLLEGE PARK, College Park, MD (US)

(*) Notice: Subject to any disclaimer, the term of this patent is extended or adjusted under 35 U.S.C. 154(b) by 1223 days.

(21) Appl. No.: 16/339,561

(22) PCT Filed: Oct. 6, 2017

(86) PCT No.: PCT/US2017/055572
§ 371 (c)(1),
(2) Date: Apr. 4, 2019

(87) PCT Pub. No.: WO2018/067955
PCT Pub. Date: Apr. 12, 2018

(65) Prior Publication Data

US 2020/0038869 A1 Feb. 6, 2020

Related U.S. Application Data

(60) Provisional application No. 62/542,387, filed on Aug. 8, 2017, provisional application No. 62/405,276, filed on Oct. 7, 2016.

(51) Int. Cl.
*B01L 3/00* (2006.01)

(52) U.S. Cl.
CPC ... *B01L 3/502761* (2013.01); *B01L 3/502707* (2013.01); *B01L 3/502753* (2013.01);
(Continued)

(58) Field of Classification Search
CPC ......... B01L 3/502761; B01L 3/502707; B01L 3/5027; B01L 3/502753; B01L 2200/0652
See application file for complete search history.

(56) References Cited

U.S. PATENT DOCUMENTS 4,618,769 A 10/1986 Johnson et al.
5,521,384 A 5/1996 Lynch
(Continued)

FOREIGN PATENT DOCUMENTS

CN 103055983 A 4/2013
WO WO-2014193481 A1 * 12/2014 ............... C12Q 1/04
WO 2016063068 A2 4/2016

OTHER PUBLICATIONS

Adler, Belinda, et al. Optimizing nanovial outlet designs for improved solid-phase extraction in the integrated selective enrichment target—ISET, Electrophoresis 2012, 33, 3143-3150, 2012 WILEY-VCH Verlag GmbH & Co. KGaA, Weinheim, www. electrophoresis-journal.com.
(Continued)

*Primary Examiner* — Brian J. Sines
(74) *Attorney, Agent, or Firm* — Rowan Tree Law Group, PLLC; Frederick F. Rosenberger

(57) ABSTRACT

In an embodiment, a microfluidic chip includes a capillary is disposed between upper and lower substrates, where the capillary includes a porous monolithic structure disposed within the capillary, and a clamp structure is defined within the channel and engages with the capillary. The clamp structure comprises a thermoplastic material that, when heated to a selected temperature, deforms around the capillary to secure the capillary in alignment with the channel. In another embodiment, a microfluidic chip includes a porous monolithic brick disposed between first and second substrates, where each of the first and second substrates includes a channel extending through the substrate to the
(Continued)

brick structure to provide a fluid flow path through the each of the first substrate, the second substrate and the brick structure.

21 Claims, 12 Drawing Sheets

(52) U.S. Cl.
CPC ... *B01L 2200/0652* (2013.01); *B01L 2200/12* (2013.01); *B01L 2300/08* (2013.01); *B01L 2300/0816* (2013.01); *B01L 2300/0838* (2013.01); *B01L 2300/12* (2013.01); *B01L 2400/0406* (2013.01); *B01L 2400/086* (2013.01)

(56) References Cited

U.S. PATENT DOCUMENTS

| | | | |
|---|---|---|---|
| 6,379,920 | B1 | 4/2002 | El-Sayed et al. |
| 6,414,311 | B1 | 7/2002 | Wood et al. |
| 7,767,435 | B2 | 8/2010 | Chiu et al. |
| 8,735,822 | B2 | 5/2014 | Thomson et al. |
| 2002/0179445 | A1 | 12/2002 | Alajoki et al. |
| 2003/0219713 | A1 | 11/2003 | Valencia et al. |
| 2008/0003142 | A1 | 1/2008 | Link et al. |
| 2010/0129857 | A1 | 5/2010 | Walsh et al. |
| 2010/0203521 | A1 | 8/2010 | Klapperich et al. |
| 2010/0216208 | A1 | 8/2010 | Mueth et al. |
| 2013/0037719 | A1 | 2/2013 | Melling et al. |
| 2013/0085680 | A1 | 4/2013 | Arlen et al. |
| 2015/0321191 | A1 | 11/2015 | Kendall et al. |
| 2016/0115520 | A1 | 4/2016 | Krishnamurthy |

OTHER PUBLICATIONS

Sufian F. Al-Khaldi, et al., Accelerating Bacterial Identification by Infrared Spectroscopy by Employing Microarray Deposition of Microorganisms, Foodborne Pathogens and Disease, vol. 1, No. 3, 2004.
K.L. Andrew Chan, et al., Rapid prototyping of microfluidic devices for integrating with FT-IR spectroscopic imaging, Jun. 7, 2010, National Library of Medicine, Lab Chip, 2010, 2170-2174, The Royal Society of Chemistry 2010, www.rsc.org/loc / Lab on a chip.
Jan Eijkel, Chip-based HPLC: the quest for perfect column, Jun. 7, 2010, National Library of Medicine, Lab Chip, 2007, 815-817 / 815, The Royal Society of Chemistry 2007, www.rsc.org/loc / Lab on a chip.
Yildirim Cinar, et al., Effect of hematocrit on Blook Pressure Via Hyper viscosity, American Journal of Hypertension, Ltd. Jul. 1999; vol. 12, No. 7, Published by Elsevier Science, Inc.
Fiorini, Gina S., et al., Disposable microfluidic devices: fabrication, function, and application, BioTechniques 38:429-446, Mar. 2005, University of Washington, Seattle, WA, USA.
Fiorini, Gina S., et al., Fabrication improvements for thermoset polyester (TPE) microfluidic devices, Advance Article on the web May 11, 2007, The Royal Society of Chemistry 2007, www.rsc.org/loc / Lab on a Chip.
T.M. Floyd, et al., A silicon microchip for infrared transmission kinetics studies of rapid homogeneous liquid reactions, MicroChemical Systems Technology Center, Department of Chemical Engineering, Microsystems Technology aboratory, Massachusetts Institute of Technoogy, Cambridge, MA.
Karolin Geyer et al., Microreactors as Tools for Synthetic Chemists—The Chemists' Round-Bottomed Flask of the 21st Century? 2006 Wiley-VCH Verlag GmbH & Co., KGaA, Weinheim, Chem. Euro. J. 2006, 12, 8434-8442.
D. Helm, et al., Classification and identification of bacteria by Fourier-transform infrared spectroscopy, Journal of General Microbiology (1991), 137, 69-79.
Rachel Herzig-Marx et al., Infrared Spectroscopy for Chemically Specific Sensing in Silicon-Based Microreactors, Anal. Chem. 2004, 76, 6476-6483, Department of Chemical Engineering and Microsystems Technology Laboratories, MIT.
Lotien Richard Huang, et al., Continuous Particle Separation Through Deterministic Lateral Displacement, Science 304, 987 (2004), DOI: 10.1126/science.1094567, www.sciencemag.org, Science vol. 304, May 14, 2004.
David W. Inglis et al., Highly accurate deterministic lateral displacement device and its application to purification of fungal spores, Biomicrofluidics 4, 024109 (2010), 2010 American Institute of Physics.
David W. Inglis, et al., Critical particle size for fractionation by deterministic lateral displacement, Mar. 17, 2006, www.rsc.org/loc / Lab on a Chip.
Mossoba, M.M., et al., Application of a Novel Hydrophilic Infrared-Transparent Membrane to the Differentiation between Microcoloies of Enterobacter sakazakii and Klebsiella pheumoniae, Journal of Food Protection, vol. 70, No. 5, 2007, pp. 1241-1245.
William C. Patrick, III, et al., Continuous Centrifugation in Virus Processing, Journal of Biochemical and Microbiological Technology and Engineering, vol. II, No. 1, pp. 71-80 (1960).
Aaron M. Streets, et al., Chip in a lab: Microfluidics for next generation life science research, AIP Biomicrofluidics 7, 011302 (2013), http://dx.doi.org/10.1063/1.4789751.
Christopher C. Striemer, et al., Charge- and size-based separation of macromolecules using ultrathin silicon membranes, 2007 Nature Publishing Group, Nature, vol. 445, Feb. 15, 2007, p. 749-753.
Jiashu Sun, et al., Double spiral microchannel for label-free tumor cell separation and enrichment, www.rsc.org/loc; Lab Chip, 2012, 12, 3952-3960.
Junya Takagi et al., Continuous particle separation in a microchannel having asymmetrically arranged multiple branches, www.rsc.org/loc; lab on a chip, May 19, 2005.
Masumi Yamada et al., Microfluidic Particle Sorter Employing Flow Splitting and Recombining, Dept. of Chem. & Biotech., School of Engineering, UofTokyo, Anal. Chem. 2006, 78, 1357-1362.
Kerwin Kwek Zeming, et al., Rotational separation of non-spherical bioparticles using I-shaped pillar arrays in a microfluidic device, Mar. 27, 2013, www. nature.com/naturecommunciations.
International Preliminary Report on Patentability and Written Opinion for International Application No. PCT/US2017/055572 dated Apr. 18, 2019, 13 pages.
European Search Report Application No. 14803403.6-1405, dated Jan. 2, 2017.
Frank Bokeloh, Master Thesis Design and Fabrication of Microfluidic Platform for Raman Spectroscopy Based Cell Diagnostics, http://www.dcu.ie/ducreeje/Reprints/Bokelohl13masters.pdf, Apr. 15, 2013, pp. 1-89.
Garip Sebnem, The Characterization of Bacteria with Fourier Transform Infrared (FTIR) Spectroscopy, http://citeseerx.ist.psu.edu/viewdoc/download?doi=10.1.1.632.7642&rep=rep1&type=pdf, Graduate School of Natural and Applied Sciences of Middle East Technical University, Jan. 1, 2005, pp. 1-99.
R.J. Davis et al., Fourier Transform Infrared (FT-IR) Spectroscopy: A Rapid Tool for Detection and Analysis of Foodborne Pathogenic Bactieria, Microbial Biotechnology vol. II, Jan. 1, 2010, pp. 1582-1594, https://www.researchgate.net/profile/Reeta_Davis/publication/257781807_Fourier_Transform_Infrared_FT-IR_Spectroscopy_A_Rapid_Tool_for_Detection_and_Analysis_of_Foodborne_Pathogenic_Bacterial/links/5614e8f108ae4ce3cc649412.pdf.
Sarah Pegram, All Graduate Theses and Dissertations Graduate Studies Use of Fourier Transform Infrared Spectroscopy for the Identification of Bacteria of Importance to the Food Industry, Jan. 1, 2007, http://digitalcommons.usu.edu/cgi/viewcontent.cgi?article=1072&context=etd*abstract.
Kerwin Kwek Zeming et al., Rotational separation of non-spherical bioparticles using I-shaped pillar arrays in a microfluidic device, Nature Communications, vol. 4, Mar. 27, 2013, p. 1625.

(56) References Cited

OTHER PUBLICATIONS

Mohamed Al-Fandi et al., New design for the separation of microorganisms using microfluidic deterministic lateral displacement, Robotics and Computer Integrated Manufacturing, vol. 27, No. 2, Apr. 1, 2011, pp. 237-244.
Tian, W et al., Microfluidics For Biological Applications. New York; Springer Science + Business Media. 2008, a-ISBN: 978-0-387-09480-9, p. 47.
Alvarez-Ordonez, A et al., Fourier Transform Infrared Spectroscopy As A Tool To Characterize Molecular Composition And Stress Response In Foodborne Pathogenic Bacteria. Journal of Microbiological Methods, Mar. 2011, vol. 84, No. 3; pp. 369-378.
PCT Search Report for PCT/US14/00137 dated Aug. 28, 2014.
Zelenin, Sergey et al., Bacteria Isolation from Whole Blood For Sepsis Diagnostics, 15th International Conference on Miniaturized Systems for Chemistry and Life Sciences, Jan. 1, 2011, pp. 518-520.
Hansson, Jonas, Microfluidic blood sample preparation for rapid sepsis diagnostics, Jan. 1, 2012, XP055594823, ISBN: 978-91-7-501428-9, 52 pages.
Extended European Search Report from the European Patent Office for European Patent Application No. 19168711.0, dated Jun. 21, 2019, 9 pages.
Notification of Transmittal of International Search Report and Written Opinion including International Search Report and Written Opinion for International Application No. PCT/US2017/055572 dated Feb. 9, 2018, 21 pages.

* cited by examiner

INTEGRATION OF POROUS MONOLITHIC STRUCTURES WITHIN MICROFLUIDIC SYSTEMS

CROSS REFERENCE TO RELATED APPLICATIONS

This application is a national stage application under 35 U.S.C. § 371 of International Application PCT/US2017/055572, filed Oct. 6, 2017, entitled "Integration Of Porous Monolithic Structures Within Microfluidic Systems", which claims priority to U.S. Provisional Patent Application No. 62/542,387, filed Aug. 8, 2017, entitled "Integration Of Porous Monolithic Structures Within Microfluidic Systems", and U.S. Provisional Patent Application No. 62/405,276, filed Oct. 7, 2016, entitled "Integration Of Porous Monolithic Structures Within Microfluidic Systems", the entire disclosures of which are incorporated herein by reference.

FIELD

The present invention relates to the formation of monolithic structures and integration of such structures within microfluidic systems.

BACKGROUND

Monolithic structures are highly porous structures that provide high permeability and surface area for different applications. In particular, monolithic structures are frequently utilized in chromatography for separating analytes and also in microfluidic devices. Polymer monoliths are typically utilized with microfluidics for analytical applications where high surface area, controllable pore size, and functionalized surfaces are desirable features for the monoliths. These include three dimensional surfaces for antibody and enzyme immobilization, solid phase extraction, and serving as supports for micro and nanoparticles.

Monolithic structures can be synthesized from a wide variety of materials such as silica and monomers that are subsequently polymerized (e.g. acrylates). The pore size in a monolith can be controlled by fabrication conditions and can extend from sizes on the order of nanometers to several microns. Monolithic structures are typically fabricated by conducting a polymerization reaction within a solvent where the monomeric forms are more soluble than the polymeric form. The reaction kinetics and differential solubility of the reaction are controlled by the choice of the solvent, concentration of precursor and/or other components, and other reaction conditions. As the reaction proceeds, a network of phase-separated polymeric reaction products is formed that eventually results in the formation of the monolithic structure.

When integrated for use in microfluidic applications, the monolithic structure is typically formed in situ by UV photopolymerization. However, such fabrication methods face a number of challenges. The use of a mask during the process, and its diffraction of UV light, results in variability of the UV dose and consequently less control over the resolution of the monolith. Diffusion of the prepolymer components results in microheterogeneity, especially at the edges of the monolith, which may affect overall performance of the monolith. In addition, the material used to form the microfluidic chip or support (within which the monolith is being fabricated) needs to be UV transparent to permit UV photopolymerization of the monolith during its formation in situ. The microfluidic support must also be compatible with the solvents used during the formation process. Such constraints limit the range of materials that can be used for forming the monolithic structure within the support. Further, because monoliths shrink during some of the fabrication steps, additional steps to ensure that they bond to the channel walls must be implemented. This limitation constrains the aspect ratio (hydrodynamic diameter to length) of the monolith to relatively low values. A high aspect ratio for the monolithic structure permits the use of higher flow rates during use without a dramatic increase in pressure and is thus desired in applications involving large sample volumes.

In some embodiments, monolithic structures encased in glass capillaries have been integrated within polydimethylsiloxane (PDMS) support structures or chips. However, such techniques are challenged with sealing the capillaries, lowering microheterogeneity and aligning of the capillaries within microfluidic channels within the chips.

Accordingly, it would be desirable to integrate monolithic structures within a microfluidic system while ensuring proper alignment and sealing of the capillaries within such structures.

Further, it would be desirable to utilize a microfluidic system integrated with monolithic structures for rapid analysis of components within a fluid. For example, a major obstacle to treating infections (for example bacteria, fungal, viral, etc.) effectively and rapidly is the lack of timely information about the identity of the infection-causing pathogen. Since current test results typically take 2-3 days before they are available, physicians frequently treat patients with unnecessary and sometimes inappropriate antimicrobials that they often do not need. When treating conditions like sepsis and hospital-acquired infections, patients are typically treated with antibiotics, but there is no reliable way to know if that treatment is effective. The Center for Disease Control observes that 20-50% of antibiotics that patients receive are unnecessary or inadequate and 80% of patients are not treated with the right antibiotic. Conditions like Sepsis have mortality rates of 34% and cost $20.3 billion annually, and infections remain a leading cause of morbidity and mortality among military personnel with combat injuries. The impact of these infections, mostly caused by bacteria, can be reduced if physicians knew the identity of the infection-causing bacteria before treatment.

Too frequently, a physician learns that treatment is insufficient only when the patient's condition gets worse or if they develop adverse reactions to the treatment. This practice is associated with longer hospital stays and complications both of which increase the cost of treatment; not to mention high mortality rates and spread of multidrug-resistant bacteria (MDRB). Significant reductions in costs, complications, and mortality are possible if the infection-causing bacteria can be identified sooner than currently possible.

Certain analytical methods enabling culture-free detection and identification of bacteria from clinical blood samples are emerging. However, these techniques typically require the isolation and purification of bacteria from blood. The use of affinity capture to immobilize bacteria on magnetic beads for subsequent removal from the initial blood sample has been investigated. Magnetic pull-down of bacteria can be highly efficient, but requires the introduction of reagents and instrumentation that complicate assay operation, and relies on the use of affinity probes which may not support universal capture of all relevant bacteria. As an alternative to affinity-based separation, the use of size-based inertial separation of bacteria from other blood components has been demonstrated using various microfluidic platforms. A central advantage associated with inertial microfluidics for bacteria isolation is that separation may be performed in a continuous flow process without the need for additional reagents or equipment other than a pump to control sample flow in the system. However, inertial separations generally require precise control over flow rates to ensure accurate fractionation, and can only be applied to smaller bacteria with hydrodynamic radii that differ significantly from native blood cells. For example, various strains of *Escherichia coli* and *Bacillus subtilis* have major axis lengths on the order of 6-8 μm, which is similar to the diameter of human red blood cells.

To overcome the constraints associated with these active separation methods, an alternate strategy involves the selective lysis of blood cells under conditions that do not disrupt target bacteria. In this way a secondary size-based separation may be performed to remove small cell lysate particles, resulting in isolated and purified bacteria for downstream analysis. However, lab-on-chip chemical lysis requires control over multiple solution flows, and the use of detergents or chaotropic agents to permeablize cell membranes can potentially impact the performance of downstream assays and such techniques are not selective enough resulting in both lysing bacteria and creating components that are approximately the same size as the bacteria. Additionally, dilution of the lysate is required to prevent damage to target pathogens by ongoing osmotic shock, resulting in low final bacteria concentration using this approach.

Accordingly, it would be desirable to provide a diagnostic, such as a microfluidic system, that can easily and effectively identify a bacteria or other infection-causing pathogen in a relatively short time period. A similar need to identify microbial contamination rapidly exists in other areas as well such as food safety testing, water testing, pharmaceutical production, etc.

SUMMARY

In an embodiment, a microfluidic chip comprises a first substrate including a first surface and a second substrate including a second surface that engages with the first surface of the first substrate to form a fluid tight interface therebetween, where the first surface includes a channel formed therein that facilitates a flow of fluid within the chip. A capillary is disposed between the upper and lower substrates and in fluid communication with the channel, where the capillary includes a porous monolithic structure disposed within the capillary, and a clamp structure is defined within the channel and engages with the capillary. The clamp structure comprises a thermoplastic material that, when heated to a selected temperature, deforms around the capillary to secure the capillary in alignment with the channel.

In another embodiment, a method of securing a monolithic structure within a microfluidic chip comprises providing a first substrate including a first surface and a second substrate including a second surface, where the first surface includes a channel formed therein that facilitates a flow of fluid within the chip. A clamp structure is provided within the channel, where the clamp structure comprises a thermoplastic material. A capillary including a porous monolithic structure disposed within the capillary is also provided, where the capillary is provided between the first and second substrates such that the clamp structure engages with the capillary. The chip is formed by applying heat to secure the first substrate against the second substrate such that the first surface forms a fluid tight interface with the second surface and the clamp structure is deformed around the capillary to secure the capillary in alignment with the channel.

In a further embodiment, a microfluidic chip comprises a first substrate including a depression on a surface of the substrate, a porous monolithic brick structure disposed within the depression of the first substrate, and a second substrate secured to the first substrate with the brick structure being disposed between the first and second substrates. Each of the first and second substrates includes a channel extending through the substrate to the brick structure to provide a fluid flow path through the each of the first substrate, the second substrate and the brick structure.

In still another embodiment, a method of processing a fluid comprises providing the fluid to an inlet of a microfluidic chip, and lysing non-bacterial components while leaving bacterial components intact as the fluid flows through a porous monolithic structure disposed within the microfluidic chip, where a passage rate of intact bacterial components flowing through the porous monolithic structure is at least 90%.

The above and still further features and advantages of the present invention will become apparent upon consideration of the following detailed description of specific embodiments thereof.

BRIEF DESCRIPTION OF THE DRAWINGS

Like reference numerals have been used to identify like elements throughout this disclosure.

DETAILED DESCRIPTION

Figure 1:
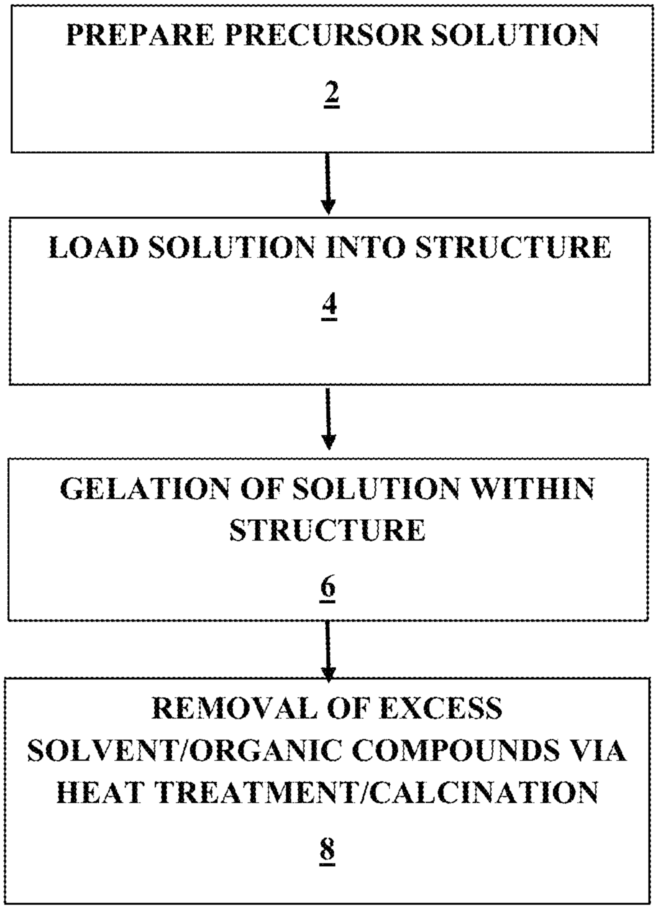
FIG. 1 is a flowchart showing process steps for forming a monolithic structure within a housing structure in accordance with the present invention.

As described herein, porous monolithic structures are formed which can be integrated within microfluidic systems to facilitate processing of fluids such as bodily fluids (e.g., fluids including blood) and other types of fluids. The microfluidic systems incorporating monolithic structures can be configured to isolate and concentrate different types of bacteria for further analysis, where the monolithic structures are configured to separate components (e.g., by lysing and/or separating blood cells and/or other components) within a fluid passing through the monolithic structures while substantially permitting passage of intact bacteria within the fluid for further analysis downstream from the monolithic structures.

In certain embodiments, porous monolithic structures are initially formed within capillaries and are then integrated within a microfluidic system utilizing one or more capillary clamps that effectively maintain the capillaries in position while the capillaries are secured at selected locations of the system. In such embodiments, the one or more capillary clamps effectively hold the capillaries in proper position or alignment with one or more channels of the microfluidic system while a thermoplastic material is melted to flow or reflow around the capillaries such that, upon solidification of the material, the capillaries are effectively secured to a support of the system (e.g., a microfluidic chip). Further, at least some of the capillary clamps can comprise the thermoplastic material that is melted to flow around capillaries and then solidified to secure the capillaries to the support. Utilizing thermoplastic flow material to secure the capillaries in position with the microfluidic support further effectively seals the capillaries with low dead volume. The sealing further provides a substantially fluid tight barrier between the flowed clamp structure and a portion of the capillary to which the clamp structure is connected so as to ensure fluid flows through (and not around) the capillary and porous monolithic structure disposed within the capillary.

In other embodiments, porous monolithic structures are initially formed as rod like structures within channels defined in a mold, where the rod like structures are subsequently removed from the mold. In such embodiments, individual monolithic structures can be cut from the rod like structures to form smaller porous monolithic structures or "bricks". The monolithic brick structures can have any suitable sizes and cross-sectional shapes (e.g., cross-sectional shapes that are circular or round, polygonal such as rectangular or square, elliptical or oval, etc.), including long brick structures having large length to diameter (or transverse cross-sectional dimension) ratios, as well as small brick structures that have a surface area that is much larger than the thickness/length of each brick. When the monolithic brick structure is integrated within a microfluidic system, the thickness of the monolithic brick defines the flow path of fluid or path length through the brick. In small sized brick structures, the surface area of the fluid flow path (defined by the surface area of the brick) is much greater than the length of the fluid flow path through the monolithic brick. In particular, the flow path surface area (SA) is defined as the area of the monolithic brick structure that is orthogonal to the flow path through which fluid flows through the brick structure, while the flow path length (L) is the length of the fluid flow path through the brick structure. The porous monolithic brick structure can be dimensioned such that the ratio of SA/L is greater than 1. This facilitates a greater throughput of fluid to be processed by the brick structure during operation in relation to standard or conventional sized filtration or separation columns (which typically have high length to diameter or L/D ratios that are greater than 1). In other embodiments, a porous monolithic brick structure can have a SA/L ratio that is no greater than 1 (e.g., greater than 0.1 but no greater than 1.0), where the brick structure can have a length that is much greater than its transverse cross-sectional dimension.

As used herein, the term "microfluidic system" refers to a fluid processing system including components having sizes on the sub-millimeter scale. For example, a microfluidic system can include a chip (e.g., a small scale component having a "lab-on-a-chip" configuration) having sub-millimeter or micron size components including channels having dimensions (e.g., length, diameter/width and/or depth) on the order of 10,000 microns (micrometers) or less, 1,000 microns or less, 100 microns or less, or even 10 microns or less. The microfluidic systems can further process fluids at flow rates from, e.g., about 5 microliters per minute to about 1 milliliter per minute or greater.

The present invention can integrate monolithic structures within one or more supports of any suitable microfluidic system. In example embodiments, the microfluidic system comprises one or more base platforms or chips. The microfluidic chips can be formed from any thermoplastic and/or other suitable materials including, without limitation, glass, silicon or silane based materials such as PDMS (polydimethylsiloxane), cyclic olefin polymer (COP) materials, etc. The chips are configured to include channels that facilitate flow of fluids through the channels (e.g., via micro-pumping or capillary action) in small volumetric sizes (e.g., in μL) so as to facilitate a variety of different operations for the microfluidic system (e.g., for DNA or other molecular screening, separation and/or analysis for a variety of different applications). In example embodiments, the microfluidic chips may be configured for insertion within an instrument within a laboratory environment or for field use in which fluids are analyzed and/or processed for different applications. Examples of microfluidic systems including one or more chips within which monolithic structures may be integrated in accordance with techniques as described herein are described in U.S. patent application Ser. No. 14/893,689 (published as US Patent Publication No. US 2016/0115520 A1), the disclosure of which is incorporated herein by reference in its entirety.

The chips of the microfluidic systems can include one or more different process areas or stations which process fluids flowing through the channels of the chip. Monolithic structures that are integrated within a chip of the microfluidic system can be configured as a process station for the chip, where the monolithic structures perform a particular processing function for fluid flowing through the monolithic structures. The monolithic structures can perform a variety of different processing operations for fluids flowing within the chip including, without limitation, separation of analytes within the fluid, filtration of the fluid, biosensing of components within the fluid, and lysing of components within the fluid.

The monolithic structures can be formed of any suitable materials (e.g., silica based materials acrylate materials such as methacrylates, etc.) and via any suitable techniques to obtain a suitable porosity with desired pore dimensions throughout the structures. The pore dimensions are preferably sized to be sufficiently large to accommodate passage of intact bacteria of interest through the pores while lysing and/or separating blood cells or other components from a fluid flowing through the monolithic structures. The types of blood cells that can be lysed and/or separated from the fluid within the monolithic structures include red blood cells, white blood cells and platelets. Example pore sizes for the monolithic structures can range from about 0.5 μm to about 10 μm, such as from about 1 μm to about 5 μm.

The monolithic structures can be suitably configured such that the passage rate of bacterial components (i.e., bacteria) within a fluid flowing through the monolithic structures is at least about 90%, at least about 95%, at least about 99% and very nearly 100%. The passage rate of bacteria is determined as (((number of bacteria in fluid exiting a monolithic structure)−(number of bacteria in fluid entering monolithic structure))/(number of bacteria in fluid entering monolithic structure))×100.

The monolithic structures can further be suitably configured such that the passage rate of certain components, such as blood cells (e.g., red blood cells) within a fluid flowing through the monolithic structures no greater than about 10%, such as no greater than about 5% or even no greater than about 1%. The passage rate of components (e.g., red blood cells) is determined as (((number of components in fluid exiting a monolithic structure)−(number of components in fluid entering monolithic structure))/(number of components in fluid entering monolithic structure))×100.

In example embodiments, monolithic structures are formed via a sol-gel process within small diameter tubes or capillaries, where the capillaries are then segmented for integration/connection with one or more microfluidic chips. In other example embodiments, monolithic structures are formed via a sol-gel process within channels of a mold, where rod-like monolithic structures can then be removed from the mold for integration within a microfluidic system as described herein.

Porous silica synthesis involves a competitive process of sol-gel transition and separation into a co-continuous binary phase via spinodal decomposition of a liquid mixture of alkyl silicates and porogen in acidic solution. Hydrolysis and condensation of silica are the major reactions which enable the formation of silica glass from liquid alkyl silicate at relatively low temperature. As the chemical reactions progress, entropic loss from the condensation of two silanol groups increases the Gibbs free energy, leading to separation into silicate-rich and solvent-rich phases. Slow hydrolysis under acidic conditions is required to uniformly hydrolyze all alkyl silicates, followed by a gradual increase in pH to trigger the condensation reaction to induce homogeneous phase separation in the mixture, resulting in the formation of the single porous monolithic structure.

As further described herein, techniques are provided for selective lysing of components within a fluid utilizing one or more monolithic structures integrated within a microchip of a fluid processing system, where a monolithic structure selectively separates and/or lyses certain components from a fluid flowing through the monolithic structure while facilitating pass through flow of certain bacteria such that the bacteria remains intact within the fluid after passing through the monolithic structure. The intact bacteria can then be separated from the other components (e.g., based upon a size difference between lysed components and the intact bacteria), where the intact bacteria is then detected and identified within the fluid in a rapid manner within the microchip and/or fluid processing system, e.g., utilizing methods as described in U.S. patent application Ser. No. 14/893,689. It is noted that this is a significant distinction from previous attempts to utilize porous monolith structures to process bacteria, where the monolith structures were used to lyse the bacterial cells, e.g., in order to access markers such as DNA and/or other components of the bacterial cells. In contrast, in accordance with the present invention, porous monolithic structures are utilized to separate bacterial cells from other components within a fluid by maintaining the bacterial cells intact (i.e., substantially no lysis of the bacterial cells occurs during process of the fluid flowing through the porous monolithic structures).

In particular, selective cell lysis utilizing a porous monolithic structure (e.g., a silica monolith) provides a simple flow-through method for intact bacteria isolation. This technique is very effective for identifying particular types of bacteria in a blood sample analyzed utilizing a microfluidic system as described herein. Further, porous monolithic structures can be integrated within a microfluidic system to provide high throughput processing of samples (i.e., a further advantage in relation to conventional blood or other fluid processing systems). However, the techniques enabled by the present invention are not limited to processing/analyzing blood samples. The present invention also facilitates processing/analysis of other types of fluids including, without limitation, urine, sputum, pharmaceutical processing streams, cerebrospinal fluid, etc. Other example processes that can be implemented utilizing the present invention include food safety testing, water testing, pharmaceutical production, etc.

The porous monolith structure serves to induce high mechanical shear stress during cell perfusion through the monolith, enabling efficient lysis and/or separation of certain components, e.g., blood cells including erythrocytes or red blood cells, leukocytes or white blood cells, and platelets, while maintaining the integrity of bacteria (e.g., gram positive, gram negative and/or gram variable bacteria, or other micro-organisms, viruses, fungi, etc.) traversing the porous flow path. The components can have sizes larger than, smaller than and/or similar in size as the bacteria, where larger sized components can be lysed by shear stresses applied when passing through smaller sized pores, and smaller sized components (e.g., components at about the same size or smaller in relation to the bacteria of interest) can also be lysed based upon the fragility of the outer surface or cell membrane of the components in relation to the more rigid or robust bacteria of interest within the fluid being processed.

Utilizing techniques as described herein, efficient selective lysis can also be achieved for certain gram negative as well as gram positive and gram variable bacteria which may be more prone to unwanted shear-induced lysis due to the lack of an outer lipopolysaccharide cell membrane. Robust operation over a wide range of bulk flow rates and flow velocities is enabled utilizing the techniques as described herein. The use of selective mechanical lysis is also shown to result in smaller blood cell fragments than chemical lysis, thereby conferring a greater size difference between bacteria and lysate particles for improved downstream separation.

As used herein, the term “bacteria” is understood to generally represent all forms of bacterial, fungal, viral, and other microorganisms (unless it is clear from the context that only bacteria or some other microorganism is being discussed).

Formation of a Monolithic Structure within a Capillary or a Mold

An example embodiment of a process for formation of a monolithic structure within a capillary or a mold via a sol-gel process is described with reference to FIGS. 1 and 2. The silica monolith was prepared from a precursor solution (Step 2 in FIGS. 1 and 2) comprising alkyl silicates, with PEG (polyethylene glycol) as a porogen, urea as a source of hydroxyl ions, and acetic acid as a solvent. The addition of urea in the starting mixture is effective in minimizing heterogeneity of gel that forms. Unlike conventional methods for forming porous silica, which increase pH of the system by direct infusion of basic solution, urea can be thermally decomposed at temperatures above 80° C. leaving ammonia and methanol as products. Use of urea thus obviates the need for physical infusion of basic solution which can disrupt the soft gel phase. The source of silica for the process was provided using a mixture of TMOS (tetramethoxysilane) and MTMS (methyltrimethoxysilane). This mixture was selected as the source of silica to overcome the intrinsic volume contraction associated with a pure TMOS recipe, in which four methoxyl groups serve as crosslinking points during the condensation reaction. By using MTMS as an alkyl silicate with only three crosslinking points and one inert group, volume contraction was suppressed so that porous morphology can be uniformly formed without localized shrinkage.

Figure 2:
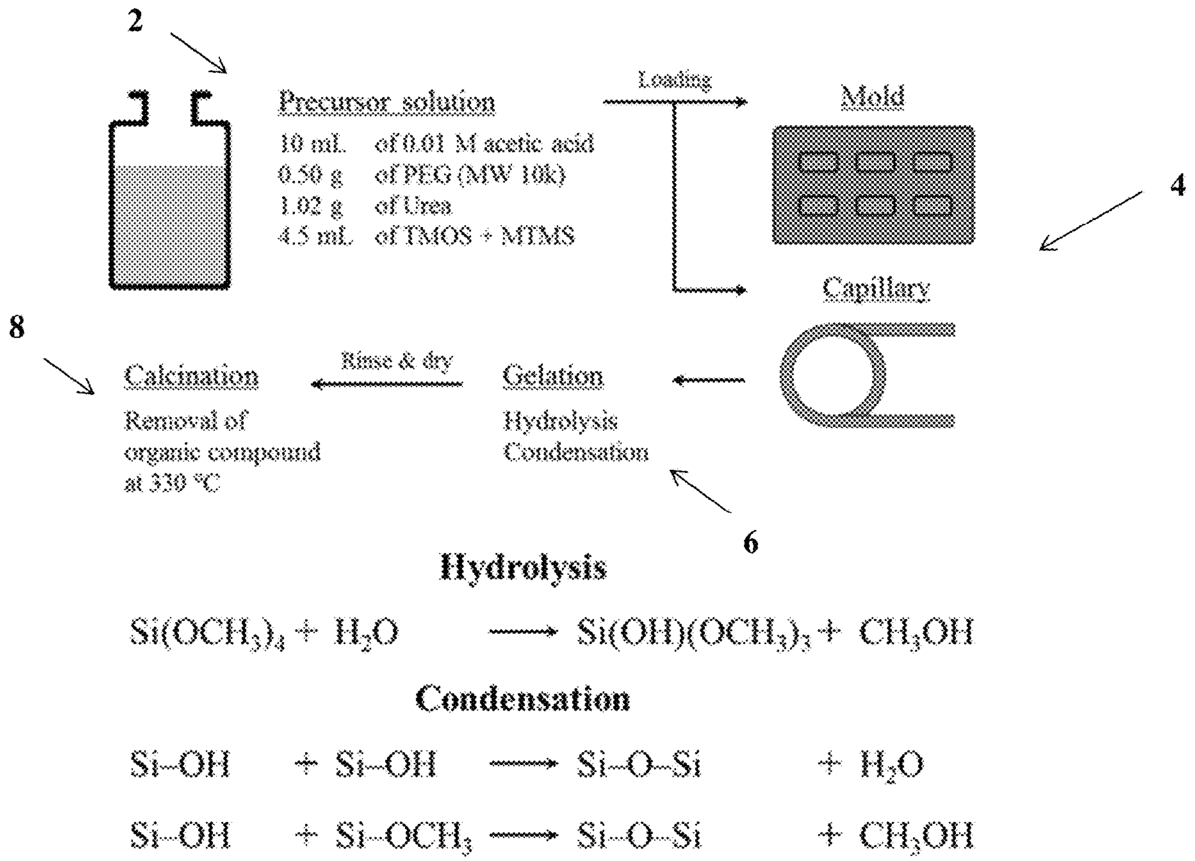
FIG. 2 is a schematic diagram showing process steps of FIG. 1, where the monolithic structure is formed within a capillary in accordance with the present invention.

The precursor mixture was prepared by adding PEG and urea into acetic acid solution and stirred in an ice bath (e.g., 0.5 g PEG and 1.02 g urea added to 10 mL of 0.01 M acetic acid, depicted as step 2 in FIG. 2). The silica source compounds, TMOS and MTMS, were then added (e.g., in an amount of 85:15 v/v ratio of TMOS to MTMS) to the solution (e.g., 4.5 mL of the TMOS/MTMS solution added to the acetic acid mixture) and stirred for a suitable time period (e.g., about 30 minutes).

After mixing, the solution was loaded into a suitable structure (Step 4 of FIGS. 1 and 2). In some embodiments, the solution was loaded into a selected length of glass capillary tubing on the micron size internal diameter (e.g., capillary tubing from Polymicro Technologies having a 100 μm internal diameter, 360 μm outer diameter) and using a 0.45 μm PTFE (polytetrafluoroethylene) syringe filter. In other embodiments, the syringe filter was utilized to inject the solution into channels of a poly methyl methacrylate (PMMA) mold.

The ends of the capillary and the mold were sealed and the solution was gelled by being heat treated at a suitable temperature (e.g., at 40° C. for about 10 hours), with further heat treatment (e.g., about 85° C. for about a 24 hour period), in which hydrolysis and condensation reactions occur (depicted as step 6 in FIGS. 1 and 2). Further heat treatment (e.g., calcination, depicted as step 8 in FIGS. 1 and 2) was also applied as needed to remove any excess solvent and organic compounds and solidify/form the monolithic structure within the capillary and within the channels of the mold.

The monolith formation process can be selectively optimized so that the monolithic structure is homogeneous and further well-anchored to the silica capillary walls. In particular, attachment of porous silica to the glass capillary during the process is the result of covalent bonding during condensation reaction between silanol groups on the capillary wall and the growing silica gel phase within the monolith (forming Si—O—Si covalent bonding between monolithic structure and interior wall surface portions of the capillary). Thus, a fluid tight connection can be achieved between the monolithic structure and the interior walls of the capillary solely by bonding during the condensation reaction such that no shrinking process step is required to shrink the internal diameter of the capillary against the monolithic structure formed therein.

Figure 3:
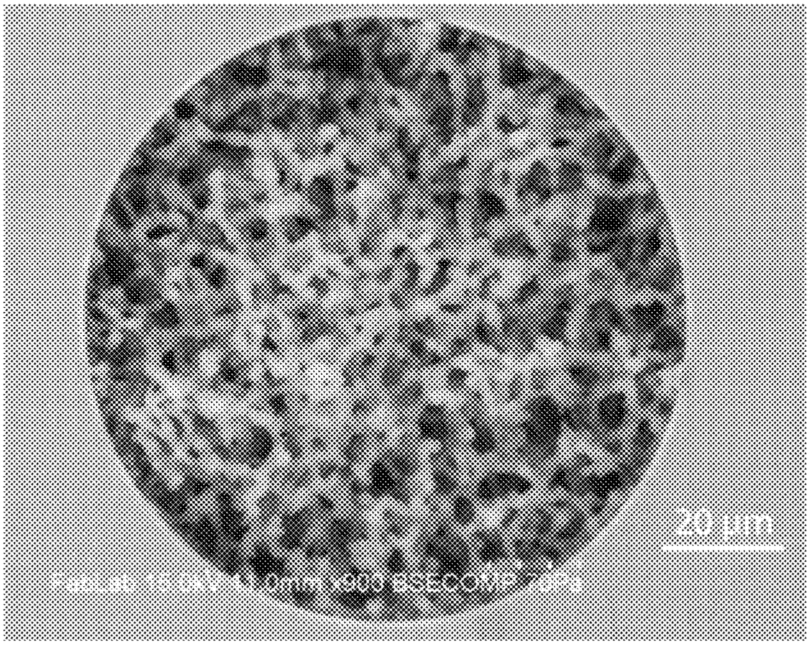
FIG. 3 is an electron micrograph image of a cross-sectional view of a monolithic structure formed within a capillary utilizing the process steps as set forth in FIGS. 1 and 2.

In an example embodiment in which a monolithic structure is formed within a glass capillary utilizing the techniques described herein, the monolithic structure formed was characterized having a thickness of 2.0 μm±0.3 μm and with average pore dimensions within the structure of 2.4 μm±0.8 μm. An electron micrograph image showing a cross-section of the silica monolith formed within the glass capillary is depicted in FIG. 3 and shows a substantially uniform porosity with excellent wall anchoring of the monolithic structure.

In an example embodiment in which a monolithic "brick" structure is formed utilizing the PMMA mold, a rod-like structure can be removed from the PMMA mold and cut into one or more monolithic bricks, where each brick can be formed having a surface area that is significantly greater than its thickness (resulting in a flow path surface area to length ratio for the monolithic brick that is greater than 1). In other embodiments, longer brick structures can be cut from the rod-like structures so as to have a length dimension that is much greater than the transverse cross-sectional dimension (e.g., width or diameter dimension).

Figure 4:
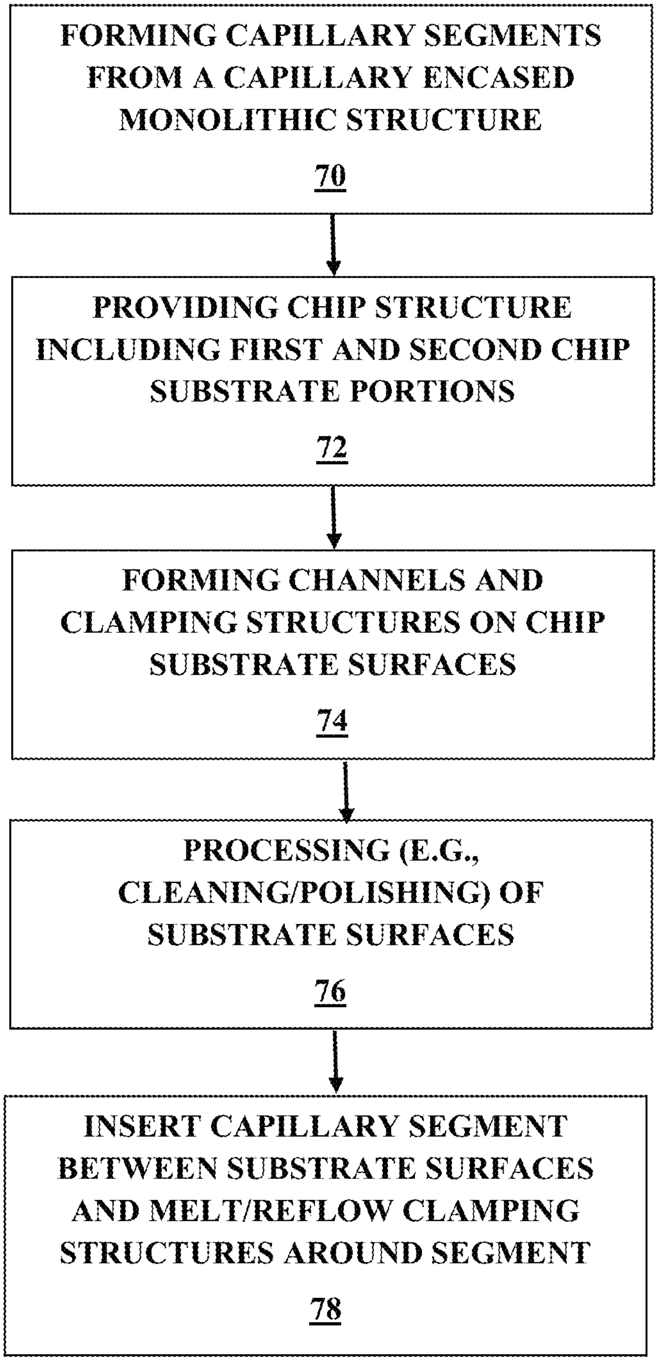
FIG. 4 is a flowchart showing process steps for integrating a capillary encased monolithic structure within a microfluidic chip in accordance with embodiments of the present invention.

Formation of a Capillary Encased Monolithic Structure within a Microfluidic Chip Utilizing Clamping Structures The capillary encased monolithic structures are incorporated within a microfluidic chip as described herein and with reference to FIGS. 4 and 5. In example embodiments, thermoplastic chips are formed of a cyclic olefin polymer (COP), such as a cyclic olefin copolymer, and capillary encased monolithic structures are integrated within such COP chips.

Figure 5A:
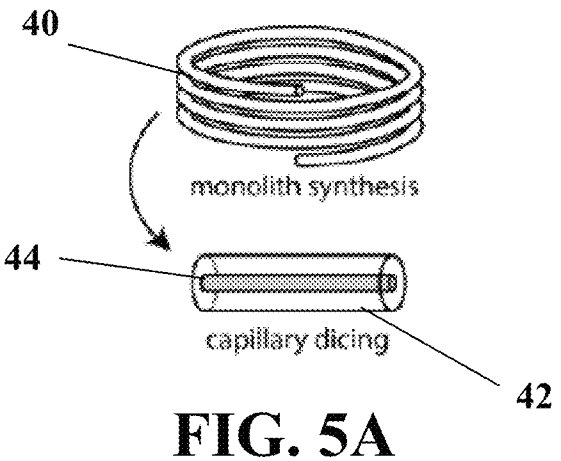
FIGS. 5A-5D are schematic views of the flowchart steps of FIG. 4.

Referring to Step 70 (FIG. 4) and FIG. 5A, a capillary encased monolithic structure 40 formed, e.g., utilizing a technique such as previously described herein, is cut into suitably sized segments 42 (e.g., segment sizes ranging from about 250 μm to about 5 mm), where each segment 42 includes an opening at each of its lengthwise ends and with a monolithic structure 44 disposed within the segment 42.

At Step 72 (FIG. 4), a chip structure including first (upper) and second (lower) chip substrate portions is provided for integrating one or more monolithic structure segments 42 into the chip. In particular, referring to FIG. 5B, a chip 10 includes a first or upper COP substrate 20 and a second or lower COP substrate 30 (e.g., 1020R chip substrates available from Zeon Chemicals, Kentucky) that combine at their facing surfaces 22, 32 (e.g., a first surface 22 and a second surface 32) to provide a fluid tight interface when brought together and bonded and sealed to form the chip. At Step 74 (FIG. 4), the chip substrates 20, 30 are processed to form channels and clamping structures along facing surfaces of the chip substrates. For example, the chip substrates 22, 32 are suitably milled in an aligned manner (e.g., utilizing a CNC milling machine) to include suitable micron sized grooves along one or both of their facing surfaces 22, 32 (FIG. 5B) such that, when combined, the substrates define enclosed microfluidic channels 60 and other features. In particular, each chip substrate 20, 30 can be milled at its first surface 22/second surface 32 to a depth of about 250 μm or less (e.g., about 180 μm or less, where depths can be varied along each chip substrate for a particular application). The milling of each substrate 20, 30 can include a raised surface portion 25, 35 that serves as a COP clamp for securing a capillary segment within the formed chip 10 as described herein. In particular, the raised surface portions 25, 35 can be formed by milling short regions to a depth that is less than the depth of the surrounding area forming a channel. For example, milling short regions to a depth of about 75 μm or less in relation to other portions of a channel (milled, e.g., to a depth of about 250 μm or less) results in the formation of the raised surface portions within the formed channels.

Thus, the clamp structures are integral with and part of the chip substrates (since they are formed as material portions of the chip substrate that are within a formed groove or channel of the substrate). In other embodiments, the clamp structures can instead be provided as separate structures added into a formed groove or channel along a chip substrate surface (where the reflow steps as described herein facilitate securing of the clamp structures within the chip substrate channels).

Figure 5B:
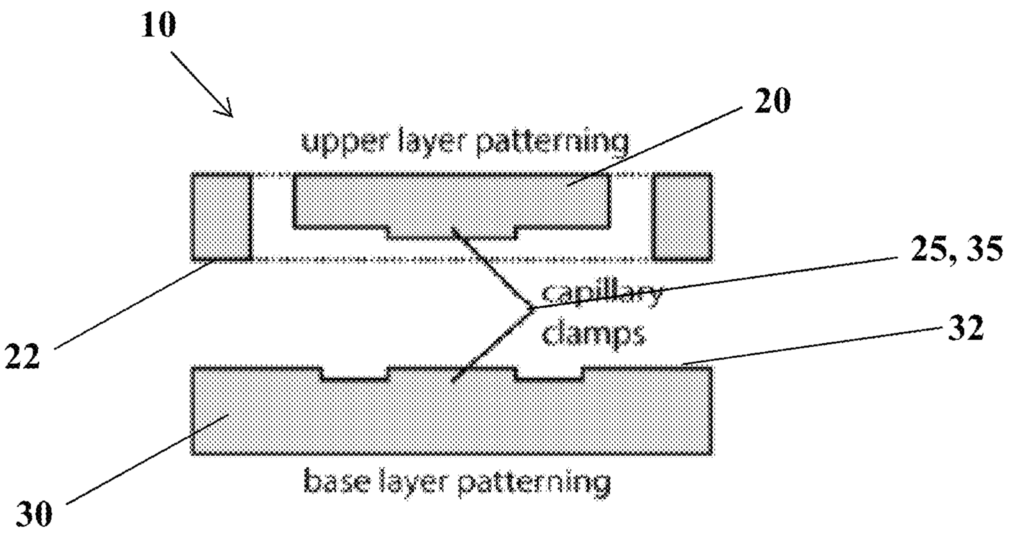

After machining/milling of the substrates 20, 30, the raised surfaces 25, 35 are processed (e.g., cleaned, polished, etc.) at Step 76 (FIG. 4) and prior to securing a capillary encased monolithic structure 44 between the substrates. For example, the raised surfaces 25, 35 of the substrates can be cleaned and/or polished by sonication in methanol, acetone, and deionized water and then dried (e.g., in a vacuum oven). The substrates 20, 30 can then be exposed to a decalin/ethanol (33/67 vol %) solution for a suitable time period (e.g., about 1.5 minutes) so as to enable solvent bonding of the COP components and to soften the raised surface portions 25, 35 (also referred to herein as the capillary clamp structures) to support polymer reflow during the bonding process as described herein. As depicted in FIG. 5B, the raised surface portions or clamp structures 25, 35 for the upper and lower chip substrates 20, 30 are aligned so as to be in a vertically stacked orientation in relation to each other (with clamp structure 25 being located directly over clamp structure 35) when the substrates 20, 30 are brought together to form the chip 10. However, in alternative embodiments and depending upon a particular desired configuration, clamp structures for the upper and lower chip substrates 20, 30 can also be offset from each other.

Figure 5C:
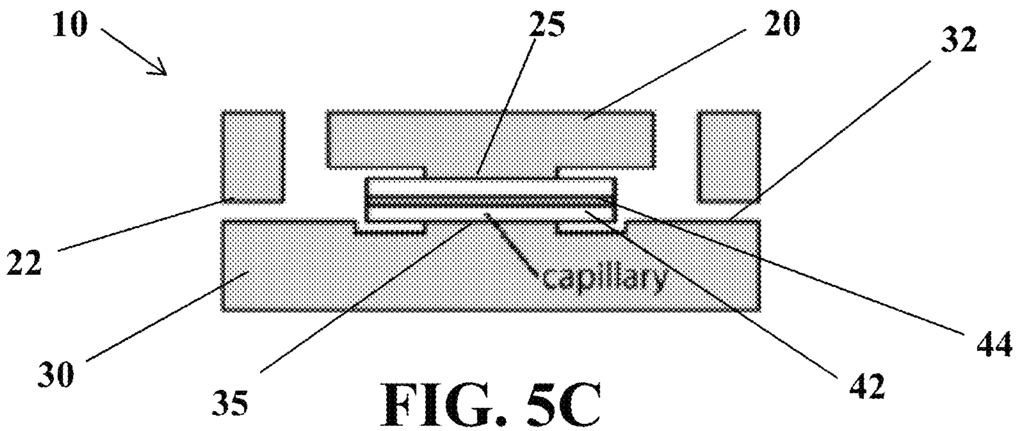
Figure 5D:
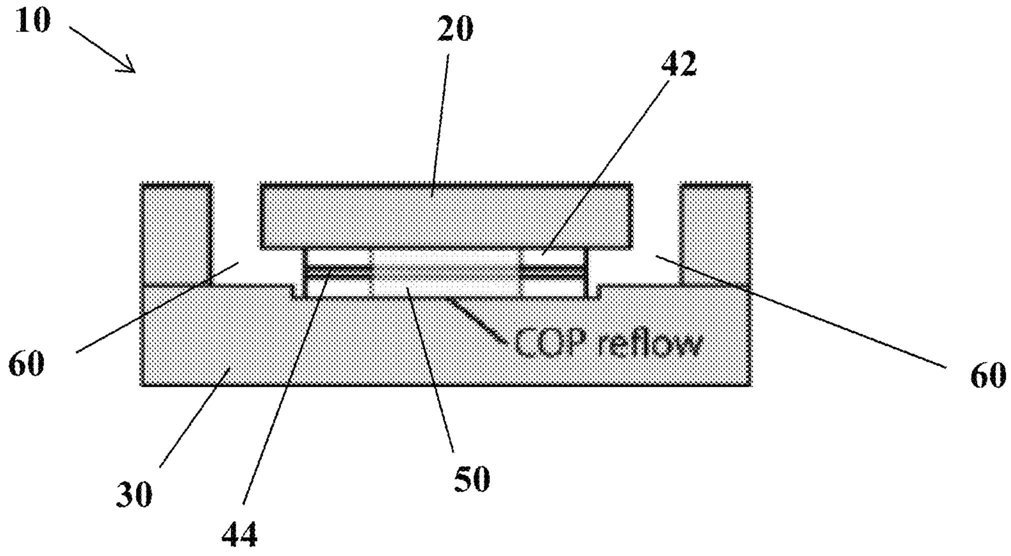

At Step 78 (FIG. 4), a capillary segment 42 is inserted between the chip substrates 20, 30 and the clamp structures 25, 35 are melted and reflowed, where portions of the melted clamp structures flow around and secure the capillary segment 42 in place within one or more channels 60 of the chip. Referring to FIG. 5C, a capillary segment 42 is inserted against the surface 32 of the lower substrate 30 so as to further align and engage with the clamp structure 35 defined along the substrate surface 32. The upper substrate 20 can then be placed on the lower substrate 30 such that the upper clamp structure 25 engages the capillary segment 42. Referring to FIG. 5D, the clamp structures 25, 35 are then melted to deform and enable a COP flow or reflow of the clamp structure material around the capillary segment 42 that effectively secures or locks the capillary 42 segment in place within the chip 10.

In an example embodiment, the assembled components (upper substrate 20, capillary segment 42 and lower substrate 30) are placed within a hot press (e.g., an AutoFour/15 press available from Carver Inc., Indiana) and a suitable temperature (also referred to herein as a reflow temperature) and pressure are applied to effectively melt and flow the COP clamp material around the capillary segment 42 as well as bond other surface portions 22, 32 of the upper and lower substrates 20, 30 together thus forming the chip 10. While temperatures and pressures can vary based upon the materials used and geometric configuration of the clamping structures, chip, capillary, etc., some example temperatures and pressures that can be utilized to reflow the COP clamp material around a capillary segment and/or bond other surface portions of the chip substrates together can include reflow temperatures ranging from about 80° C. to about 100° C. (e.g., from about 85° C. to about 95° C.) and pressures ranging from about 3000 kPa to about 6000 kPa (e.g., from about 3400 kPA to about 5500 kpA). This combined melt deformation of the clamp structures 25, 35 and bonding of the upper and lower substrates 20, 30 together at the interface defined by their facing surface portions 22, 32 effectively provides a fluid tight seal for the chip 10.

Figure 6:
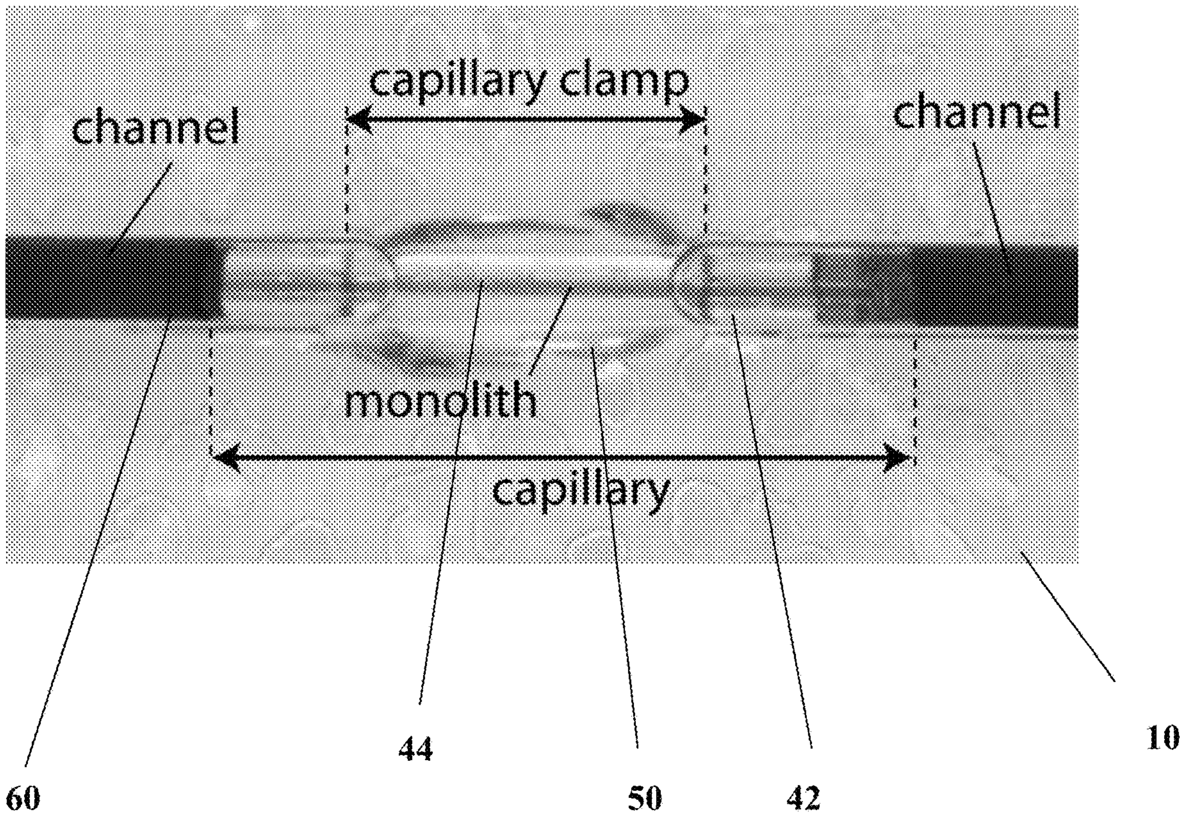
FIG. 6 is a photographic image showing a magnified view of a microfluidic chip including am integrated capillary encased monolithic structure in accordance with embodiments of the present invention.

The deforming of the clamp structures 25, 35 by melting and flowing or reflowing the COP chip material results in bonding the capillary segment 42 in place within the chip 10 and also provides a fluid tight seal within microfluidic channels around the capillary segment 42 (i.e., not permitting fluid flow between the outer wall portions of the capillary segment 42 and the surface portions 22, 32 of the substrates 20, 30 at the locations of the clamp structures 25, 35 that have now been deformed/melted). A magnified view is shown in the image of FIG. 6 of a portion of a microfluidic chip including a capillary segment secured between upper and lower substrates using clamping structures that are melted and reflowed around the segment as described herein and depicted in FIGS. 4 and 5. As shown in the magnified image of FIG. 6, the COP deformed/reflow material 50 provides an effective seal around the entire circumference of an outer surface portion of the capillary segment 42.

The location and alignment of the clamp structures 25, 35 also facilitate suitable alignment of the open ends of the capillary segment 42 with fluid channels 60 defined in the chip 10 between the two substrates 20, 30. By integrating a monolithic structure within a capillary segment, the capillary wall provides a rigid protective barrier for the monolithic structure thus allowing sufficiently high pressures for bonding the two chip substrates together without the risk of fracturing portions of one or more monolithic structures during assembly. The capillary clamps 25, 35 further provide an effective and relatively easy alignment and sealing (with melting, deformation and flow or reflow of the clamp material) around the capillary so as to ensure that fluid flows through only the capillary segment 42 (and thus through the monolithic structure 44 disposed therein) at such channel portion within the chip. Further, due to the Si—O—Si bonding between the monolithic structure 44 and the interior wall surface portions of the segment 42, the fluid is also substantially forced through the monolithic structure 44 (i.e. substantially no fluid flows completely around the monolithic structure 44 at a location between the monolithic structure 44 and an interior wall surface portion of the segment 42).

While the example embodiment of FIGS. 5 and 6 include clamp structures 25, 35 at both the upper and lower substrates 20, 30 of the chip 10, the present invention is not limited to such embodiment but instead can include a single clamp structure at only one of the two substrates while still effectively aligning and sealing the channel when the capillary encased monolithic structure is integrated within the chip. Alternatively, the chip 10 can include a plurality of clamp structures to support and secure a capillary segment therein, where one or more clamp structures are configured to melt and deform during the chip formation while other clamp structures are not melted/deformed but instead maintain their original configurations. For example, certain clamp structures can be formed of a suitable thermoplastic material (e.g., COP) while other clamp structures are formed of different materials (e.g., silica) that maintain their shape during the melt/deformation of the thermoplastic clamp structures. Clamp structures disposed on the upper and lower chip substrates can be aligned to correspond with each other (e.g., as in the embodiment of FIGS. 5 and 6) or, alternatively be offset from each other.

Further, any selected number of clamp structures (e.g., one or more) having any suitable one or more different shapes and sizes can be provided to clamp or secure one or more capillary encased monolithic structures within channels of the chip. In particular, the clamp structures can have any suitable shapes and/or dimensions that facilitate easy engagement with and alignment of a capillary segment between two chip substrates. The capillary used to encase the monolithic structure can further have any suitable dimensions and/or cross-sectional shapes including, without limitation, circular/round, elliptical, square or multi-faceted, etc. The clamp structures can also be provided with one or more capillary engaging surfaces that correspond with the outer surface contour of the capillary so as to facilitate easy engagement with a capillary segment inserted against the clamp structure. For example, a clamp structure can have a capillary engaging surface with a cross-sectional shape that is concave so as to facilitate nesting of a portion of a capillary segment having a rounded or circular cross-sectional shape within the engaging surface of the clamp structure.

While at least some of the clamp structures 25, 35 for the chip 10 are preferably formed from thermoplastic materials so as to facilitate a melting deformation and reflow of the material around the capillary encased monolithic structures as described herein, the chip substrates that define portions of the chip can be formed from the same or different materials as the thermoplastic clamp structures. For example, the chip substrates can be formed from the same material (e.g., a COP) as the clamp structures as described in the example embodiments. Alternatively, the chip substrates can be formed from a different material such as a material having a much higher melting point than the clamp structure material (e.g., the chip substrates can be formed from silica or glass), with channels formed (e.g., machined or etched) in the substrate surfaces and further with thermoplastic clamp structures provided in such channels (e.g., via a deposition process that forms a thermoplastic clamp structure within a channel). For example, a microfluidic chip may be formed of a silica based material and have channels and silica based clamp structures formed within the channels via an etching or other suitable process, where thermoplastic clamp structures can then also be formed within the channels by deposition of a suitable thermoplastic material (e.g., COP) within the channels.

The chip substrates used to form the chip can include channels formed along a surface such that, when the chip substrates are combined with each (e.g., as in the embodiment of FIG. 3), the channels of each chip substrate correspond so as to define a microfluidic channel within the formed chip. In alternative embodiments, a single chip substrate can include a channel with no corresponding channel on the other chip substrate such that the microfluidic channel is defined solely by the channel of the single chip substrate. In such embodiments, clamp structures can still be provided for either or both chip substrates that secure a capillary segment within the formed chip in a similar manner as described for the embodiments of FIGS. 3 and 4.

As previously noted, one or more porous monolithic structures can be integrated into a microfluidic chip so as to define a particular station within the chip for performing a particular processing function on a fluid flowing through the microfluidic channels of the chip. For example, a plurality of porous monolithic structures can be integrated within the microfluidic chip in a continuous flow pattern (i.e., in series) or in a parallel configuration.

The integration of porous monolithic structures encased with capillaries within a microfluidic chip as described herein provides a number of advantages over conventional techniques for providing porous monoliths within a chip. For example, conventional methods for providing porous monoliths within channels of a chip, where a porous monolithic structure can be formed in situ within a channel of the chip can lead to issues such as incomplete sidewall anchoring, large variations in pore size and density within the monolith, etc. In addition, in methods where a porous monolith is prepared and then inserted within a channel of a chip, the porous monolith can be damaged when subjected to high temperatures and/or pressures during bonding/securing of the monolith within the channel of the chip. In the present invention, by forming the porous monolithic structure within a capillary and then securing a capillary encased monolithic segment in a chip channel, the capillary protects the monolithic structure during application of heat and pressure to secure the structure within the chip channel. In addition, the use of clamp structures within the chip channel that are melted provide a flow of the clamp structures around so as to secure the capillary encased monolithic segment in place within the chip channel while ensuring fluid flow is through (and not around) the porous monolithic structure within the capillary segment.

Formation of a Monolithic Brick Structure within a Microfluidic Chip

Porous silica monolithic bricks were obtained from the silica rod-like structures formed in channels of the PMMA mold (as previously described herein with reference to FIGS. 1 and 2). After formation of the monolithic structures within the PMMA mold, the mold is opened and silica monolithic rods are removed from the mold and cut into segments or bricks. For example, the rods can be formed in square channels so as to have square cross-sections, and bricks can be formed having 3 mm×3 mm surface area dimensions and a thickness dimension of about 2 mm. However, it is noted that the bricks can formed having any suitable cross-sectional shapes (e.g., circular, polygonal, elliptical, etc.) and dimensions as desired for a particular process (where the shapes and dimensions can be defined by the channel shapes and dimensions formed in the PMMA mold and also the length at which the bricks are cut from the monolithic rods removed from the mold).

The formed silica monolith bricks were integrated into COP thermoplastic chips in the following manner. Prior to milling, COP pellets were formed into 4 mm and 2 mm thick substrates using a hot press. Using a CNC milling machine, a 2 mm diameter and 3 mm deep hole was first formed in a 4 mm thick lower substrate, together with a 3 mm square and 2 mm deep depression or socket for the monolith brick, resulting in a square socket for monolith insertion and a 1 mm deep, 2 mm diameter indentation at the bottom of the socket. An additional 3.2 mm wide and 100 μm deep slot was milled around the perimeter of the socket. This slot served as a receptacle to receive solvated COP after insertion of the monolithic brick into the socket (so as to improve sealing of monolith during the final bonding step). A 2 mm diameter and 1 mm deep hole was then milled in a 2 mm thick upper COP substrate, and needle sized ports or channels extending through both substrates for external fluidic interfacing were formed on both substrates using a 650 um drill bit. The needle sized ports provide a connection with inlet and outlet channels or conduits of the formed chip so as to facilitate a fluid flow path from an exterior surface of one substrate to the slot formed on the interior surface of the substrate, through the monolithic brick, to the slot formed on the interior surface of the substrate and then to the exterior surface of the other substrate. In other words, each of the first and second substrates includes a channel extending through the substrate to the brick structure to provide a fluid flow path through the each of the first substrate, the second substrate and the brick structure. The needle sized ports can have cross-sectional channel (e.g., diameter) dimensions that are 10,000 microns (micrometers) or less, 1,000 microns or less, 100 microns or less, or even 10 microns or less.

Each COP substrate was sonicated in methanol, acetone, and deionized water, and dried in a vacuum oven. A 2 mm diameter circular section of pressure-sensitive wafer dicing tape was patterned using a 2 mm diameter PDMS punch and adhered to the center of a porous silica brick to protect the fluidic path during monolith integration. In this process, the lower COP substrate was exposed to a decalin/ethanol (33/67 vol %) solution for 2 minutes, and the silica monolith brick was manually inserted into the monolith socket. After insertion, a solvated COP solution, prepared by slowly dissolving COP pellets in decalin to a concentration of 30 wt %, was applied using a doctor blade into the slot of the lower substrate defined around the slot into which the silica monolithic brick was inserted. The lower substrate was sufficiently dried at room temperature to evaporate decalin and to solidify the solvated COP, after which the protection tape was carefully removed from the monolith. Next, the lower and upper substrates were exposed to the same decalin/ethanol solution and bonded together in a hot press at 300 psi for 5 minutes at 35° C. Bonded devices were dried overnight in a 60° C. oven to remove excess solvent.

Figure 7:
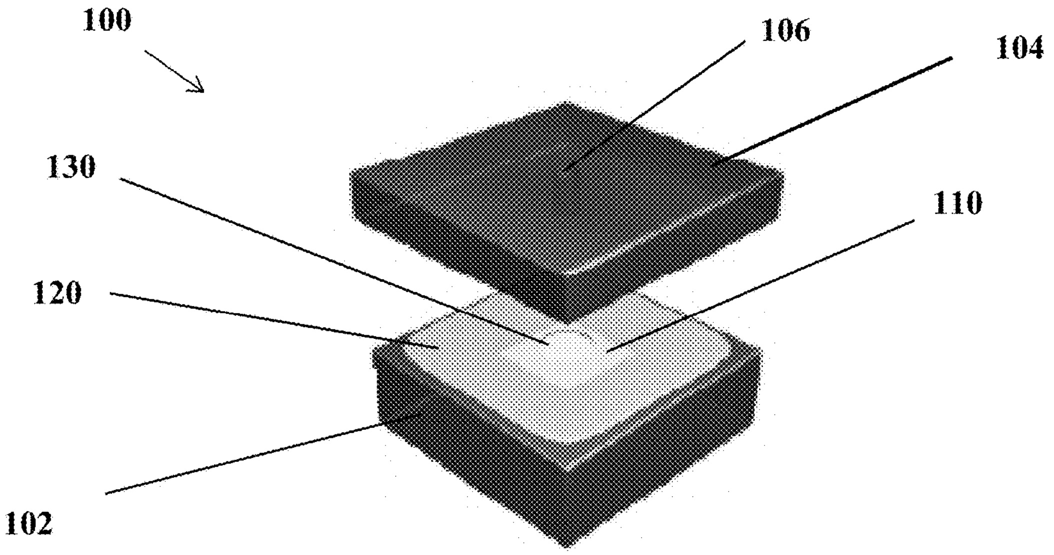
FIG. 7 is a schematic view of a monolithic brick incorporated within a partially assembled microfluidic chip in accordance with embodiments of the present invention.

The formed structure defines a monolithic brick encased microfluidic chip 100 as depicted in FIG. 7. In particular, the chip 100 includes the lower substrate 102 and the upper substrate 104, each including a needle sized port (e.g., port 106 defined in upper substrate 104, the lower substrate 102 has a similar port not visible in the view of FIG. 7) extending through the substrate to provide inlet and outlet fluid connections for the monolithic brick 110 disposed within the socket formed on the surface of the lower substrate 102. The solidified COP layer 120 is formed in the slot and also over a portion of the brick 110 on the surface of the lower substrate, where a portion 130 of the brick 110 is exposed (i.e., not covered by the COP layer 120) as a result of the protection tape that was applied and then removed from the brick 110 as previously described herein. The upper substrate 104 is connected with the lower substrate 102 to seal the brick 110 between the two substrates in a fluid tight manner. The formed chip can be integrated within a microfluidic system in any suitable configuration and with any other desired components. The surface area of the brick 110 (surface area of fluid flow path through the brick) was 9 $mm^2$ (3 mm×3 mm) and the thickness of the brick (flow path length through the brick) was 2 mm. The 2 mm diameter depression provided within each substrate on either side of the brick 110 provided a surface area opening to each side of the brick of about 3.14 $mm^2$. The ratio of fluid flow path surface area to flow path length through the brick (SA/L ratio) was at least about 1.5 and as large as about 4.5.

Monolithic bricks formed in accordance with the present invention can have any suitable dimensions, including thickness, length, width and/or diameter dimensions from 10 μm to 100 mm, e.g., from about 100 μm to about 10 mm, or from about 1 mm to about 5 mm. The dimensions are chosen depending upon a particular microfluidic system in which the structures are to be implemented and for a particular process application. The dimensions of the brick structures can be selected such that the SQ/L ratio is greater than 1. Alternatively, larger length brick structures can also be formed having SQ/L ratios no greater than 1 (e.g., greater than 0.1 but no greater than 1.0).

Integration of Microfluidic Chip within Fluid Processing Systems

A microfluidic chip can include a capillary encased monolithic structure, a monolithic brick structure, or combinations of each. The microfluidic chip can be formed in a manner as described herein and can be implemented in a variety of different fluid processing systems, including isolation and/or detection of various forms of bacteria from bodily and/or other fluids, food safety testing, water testing, pharmaceutical production, etc.

Figure 8:
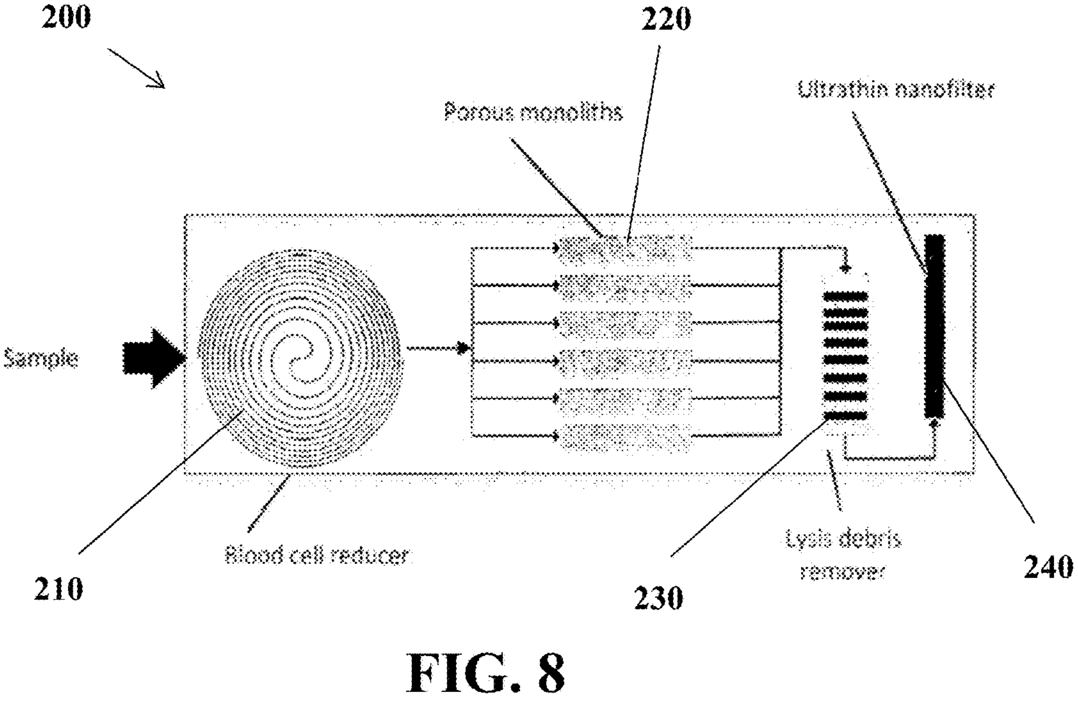
FIG. 8 is a schematic view of an example embodiment of a microfluidic detection and identification system incorporating a microfluidic chip formed in accordance with embodiments of the present invention.

An example embodiment for implementation of a microfluidic chip with porous monolithic structure formed therein is described in detail in U.S. patent application Ser. No. 14/893,689 and further with reference to FIG. 8, monolithic structures can be integrated within a microfluidic chip as part of a separation station of a fluid processing system 200. The system 200 provides a process in which bacteria or other components from a blood (or other fluid) sample are analyzed. For example, the chip can be configured to receive and process a fluid sample (e.g., via an inlet of the chip to receive the fluid and an outlet from the chip to output processed fluid and/or other processed components). The chip includes a separation stage 210 in which certain non-bacterial components (e.g., red blood cells) that are larger in size than bacteria are first separated from intact bacteria (e.g., a separation stage that uses inertial focusing to achieve separation), followed by selective lysis of the remaining non-bacterial cells in a lysis stage 220 using one or more chips containing porous monolithic structures (formed in accordance with techniques as described herein), where the porous monolithic structures can be utilized to achieve selective lysis. The result of the selective lysis of the fluid flowing through the porous monolithic structures is that the fluid contains intact bacteria and non-bacterial cell debris. The debris can then be separated from the intact bacteria at a lysis debris removal stage 230. An example embodiment of a lysis debris removal stage suitable for use in system 200 is a stage that separates intact bacteria from debris based upon differences in hydrodynamic sizes of components in the fluid (e.g., utilizing deterministic lateral displacement).

Upon selective lysis and separation of intact bacteria from certain lysed debris via the porous monolithic structures, the fluid can be filtered at a filtration stage 240 within the chip and/or at another portion of the microfluidic system 200. This allows the intact bacteria to be analyzed for identification and/or concentration within the fluid (e.g., utilizing infrared analysis, such as infrared spectroscopy, in a manner such as described by U.S. patent application Ser. No. 14/893,689). For example, a detector can be provided at a downstream location from the monolithic structure to facilitate identification and analysis of the separated and intact bacteria within a fluid stream that has exited from an outlet of the monolithic structure. The entire separation, concentration and identification of bacteria can be accomplished without the use of reagents such as DNA sequences or antibodies.

Further, a plurality of porous monolithic structures (e.g., at least two monolithic structures, as many as 100 monolithic structures or more) can be integrated within a chip (e.g., at the separation stage 220) in a parallel fluid flow arrangement (e.g., in a manner similar to that which is described by U.S. patent application Ser. No. 14/893,689 and depicted in FIG. 8). This allows fluid to flow through multiple monolithic structures at the same time to rapidly process larger volumes of fluid. For example, consider a conventional microfluidic system that processes a blood culture analysis for blood samples of 5-10 mL. The conventional microfluidic system can handle a fluid flow rate of about 0.1 mL/minute, such that it would take several minutes (e.g., about 100 minutes) to process the blood sample. Consider further the fact that a blood sample is typically diluted by 10× or greater, which would of course increase the process time considerably to process a diluted sample via a conventional microfluidic system. By providing a plurality of porous monolithic structures in parallel, the fluid flow rate through a microfluidic system of the present invention can rapidly process fluid samples at much higher fluid flow rates so as to provide an analysis of a fluid sample in a much shorter time period.

A plurality of monolithic structures can also be combined in parallel so as to serve as a filter or membrane structure (where the membrane thickness is defined by the monolith lengths). In other embodiments, a plurality of monolithic structures can be arranged in fluidic series with each other. Monolithic structures can further be of any suitable sizes, diameters (or cross-sectional dimensions) and lengths. For the capillary encased monolithic structures, such structures can be formed with length-to-diameter (L/D) ratios of at least 10, e.g., a L/D ratio of at least 100, a L/D ratio of at least 1000, a L/D ratio of at least 10000, etc. For monolithic brick structures, such structures can be formed having a flow path defined through the structure with a flow path surface area to flow path length (SA/L) ratio that is greater than 0.1 but no greater than 1.0, or greater than 1 (e.g., a SA/L ratio of at least 2, a SA/L ratio of at least 3, a SA/L ratio of at least 4, a SA/L ratio of at least 5, a SA/L ratio of at least 10, etc.).

Accordingly, any number of potential arrangements and/or dimensions of monolithic structures are possible for integration within a microfluidic chip in accordance with the present invention.

Performance of Capillary Encased Porous Monolithic Structures for Isolation of Bacteria within Fluid Samples Capillary encased porous monolithic structures integrated within a chip in accordance with the methods described herein were tested for their ability to successfully isolate certain bacterial strains within blood samples. In particular, monolithic structures formed and having varying geometries (e.g., geometries having pore sizes ranging from about 1.6 μm to about 3.2 μm) were evaluated with blood samples infiltrated with different bacterial strains and passed through the monolithic structures at varying flow conditions.

The following bacteria were selected to validate the selective isolation performance of the monolithic structures in certain tests: *A. aceti* (gram negative, 0.6-0.8 μm diameter and 1-4 μm length), *E. cloacae* (gram negative, 0.3-0.6 μm diameter and 1-2 μm length), and *B. subtilis* (gram positive, 0.25-1.0 μm diameter and 4-10 μm length). Each bacteria sample was obtained as lyophilized powder (ARL Culture Collection Center for Agricultural Utilization Research, Peoria, Ill.) and grown in a suitable culture. Resulting bacteria suspension was pelletized by centrifugation, and re-suspended with 1× phosphate buffered saline (PBS) solution after discarding supernatant.

Figure 9:
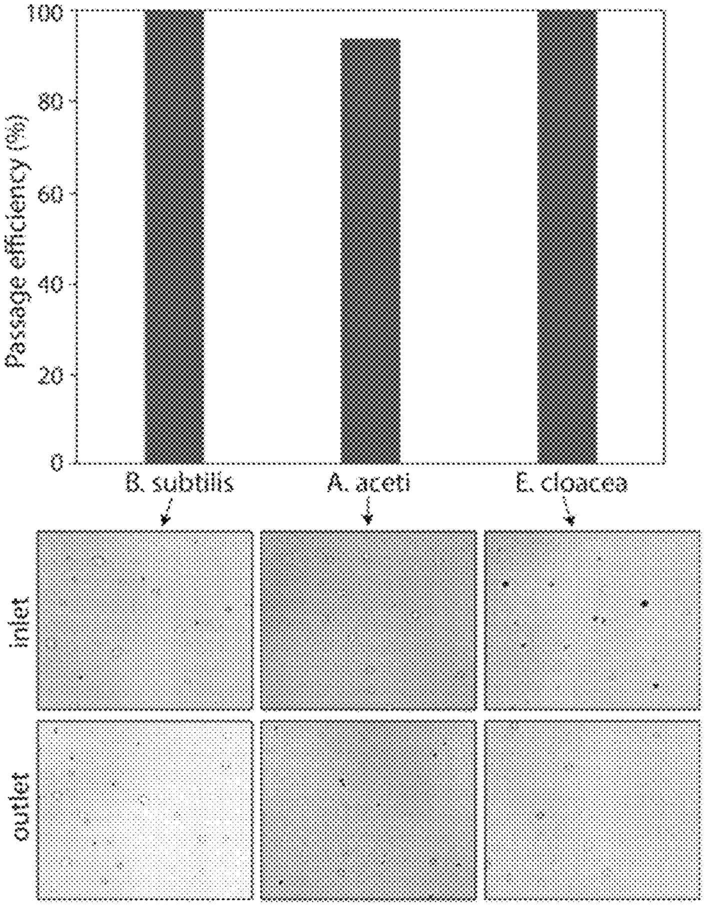
FIG. 9 includes a plot of passage rate efficiencies of three bacterial species within a fluid passed through monolithic structures formed in accordance with the present invention, and further includes optical images of the fluid at the monolith inlet and outlet.

For blood lysis testing, human whole blood was collected and diluted with 1× PBS solution to specified levels before use. Samples were analyzed before and after monolith processing (i.e., at the monolith inlet and at the monolith outlet) and passage rate of the three bacteria was determined based upon cell counts analyzed for the samples. At various trials for each bacterial species, passage rate was determined to be at least 90%, in many tests nearly 100% (refer to FIG. 9, showing images for each bacteria sample at the inlet and outlet of the monolithic structure and further a chart showing the pass rate percentage through the monolithic structure for each sample based upon a difference in cell count for the sample at the inlet and outlet). This indicates that both gram positive and gram negative strains with rod-like shape can effectively pass through the pores of the monolithic structures while remaining intact.

Figure 10:
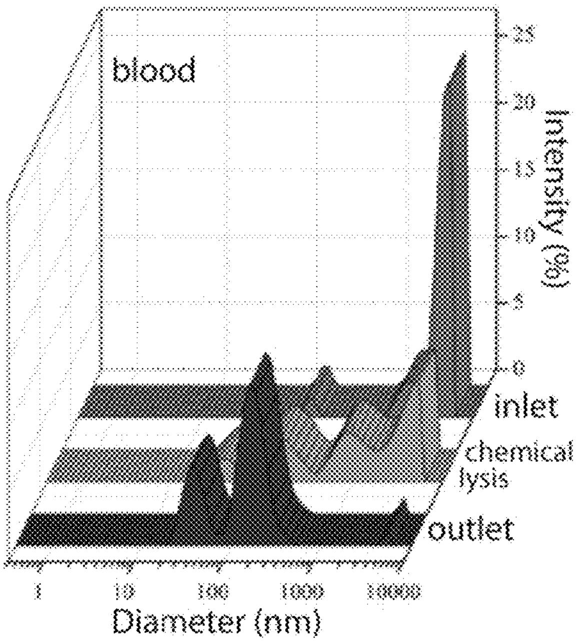
FIG. 10 includes plots of a fluid including a specific type of bacteria and a diluted blood sample, where both fluids are processed by a monolithic structure formed in accordance with the present invention, where the plots show the size of bacterial cells and erythrocytes at the monolith inlet and outlet.

Further testing of the bacteria samples and blood samples was conducted where such samples were processed by the monolithic structures. Samples were analyzed at the monolith inlet and outlet utilizing an optical microscope and dynamic light scattering (DLS). Size differences were determined at the monolith inlet and outlet between erythrocyte material and intact bacterial cells. For example, size differences within the sample prior to lysis processing were observed between erythrocytes and *E. cloacae*, with erythrocytes having radius sizes at the monolith inlet in a range of a 3-4 μm whereas bacterial cells had radius sizes in a 0.8-1 μm range (see the data plotted in the charts in FIG. 10). At the monolith outlet, the bacterial cells had the same or substantially similar size (as indicated by substantially similar peaks of the same size/intensity and at the same 0.8-1 μm location), while the size of erythrocytes varied in size under 1 μm in diameter (peaks at the monolith outlet smaller in size and varied in location), which indicates lysis of at least some erythrocyte cells into smaller fragments. This was compared with chemical lysis of a similar blood sample, where the chemical lysis of the blood sample had fragments varying from tens of nanometers to a few microns. These tests indicate an isolation of bacterial cells from erythrocytes in a blood sample by one or more of the following: i) blood cell retention at or near the inlet of monolithic structure due to size restriction of the erythrocytes; ii) entrapment of erythrocytes within the monolithic structure; and iii) stress induced mechanical lysis and release of membrane fragments and cytoplasm of erythrocytes by pressure driven flow into small pores of the monolithic structure. It was therefore demonstrated that the porous monolithic structure can isolate bacterial cells while selectively removing blood cells from a blood sample, thus allowing for bacterial detection without the addition of any chemical reagents or external stimuli.

Figure 11:
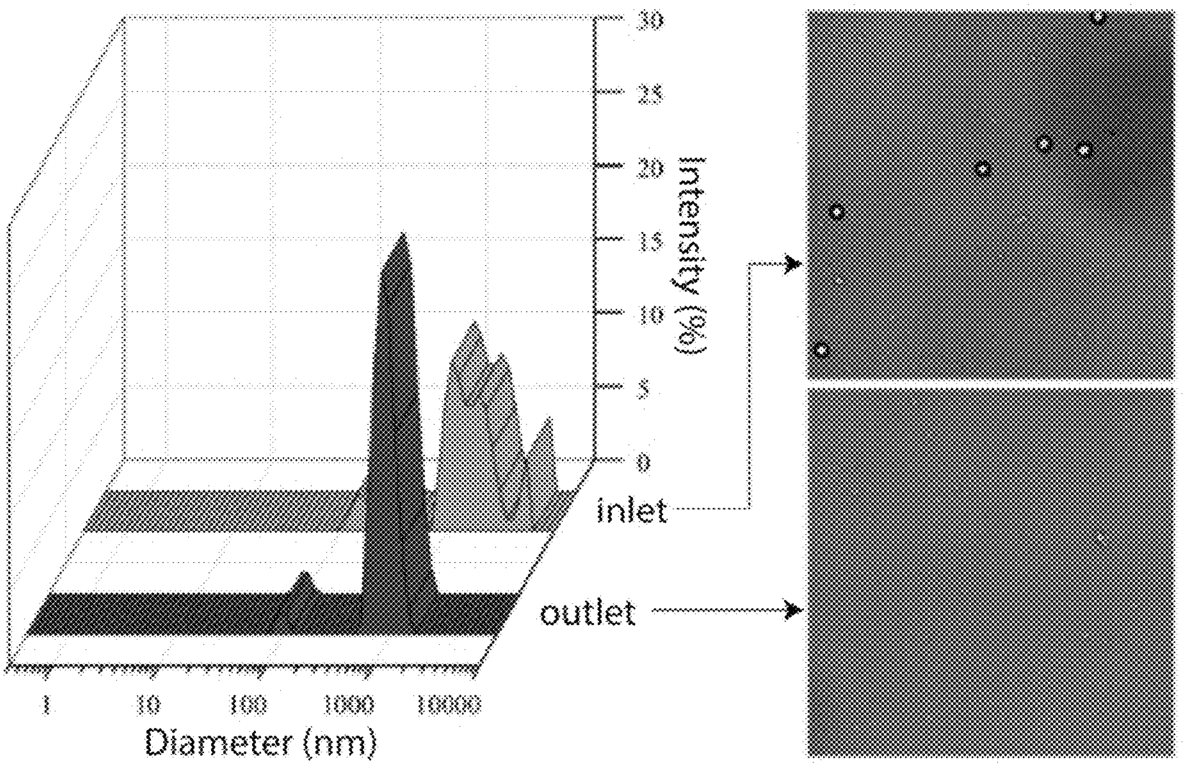
FIG. 11 includes plots of a diluted blood sample processed by a monolithic structure formed in accordance with the present invention, where the plots show the size of erythrocytes at the monolith inlet and outlet.

Similar results were observed when tested using 100× diluted blood spiked with *E. cloacae*, as shown in FIG. 11. Two significant peaks at around 100 nm and around 1 μm for the monolith outlet match closely with peaks for the analyses providing the results of FIG. 10. Both DLS results and optical microscopic images revealed that porous silica monoliths can isolate bacterial cells while selectively removing blood cells from a mixed clinical matrix.

In other tests, *L. lactis* and *M. luteus* (both gram positive) were also utilized along with *E. cloacae* and *B. subtilis* to demonstrate effect of lysis efficiency of erythrocytes by the porous monolithic structures encased within capillaries as formed in accordance with the invention.

The human erythrocyte is a discoid shaped cell with sizes of approximately 2-3 μm in thickness and 8 μm in diameter. Given the nature of its viscoelastic cell membrane, red blood cells (RBCs) can tolerate a high degree deformation at a constant volume and surface area. However, when the deformation exceeds a threshold beyond which the membrane surface area must expand to accommodate further deformation, the RBCs rupture and lyse. When the pore radius is small enough to confine a RBC into a sphero-cylindrical shape with a given cylindrical radius ($r_c$) determined as about 1.53 μm, the RBC can flow freely while deforming to fit within a pore when the pore radius is less than $r_c$. However, upon reaching a critical pore radius r* of about 1.48 μm, the flow resistance for the RBC rapidly increases with increasing tension on the RBC membrane thus causing mechanical hemolysis of the RBC. Since the pores in the porous monolithic structures have an average through-pore radius of no greater than about 1.2 μm, such structures provide a high lysis efficiency even when there is a large variance in pore size distribution.

Figure 12:
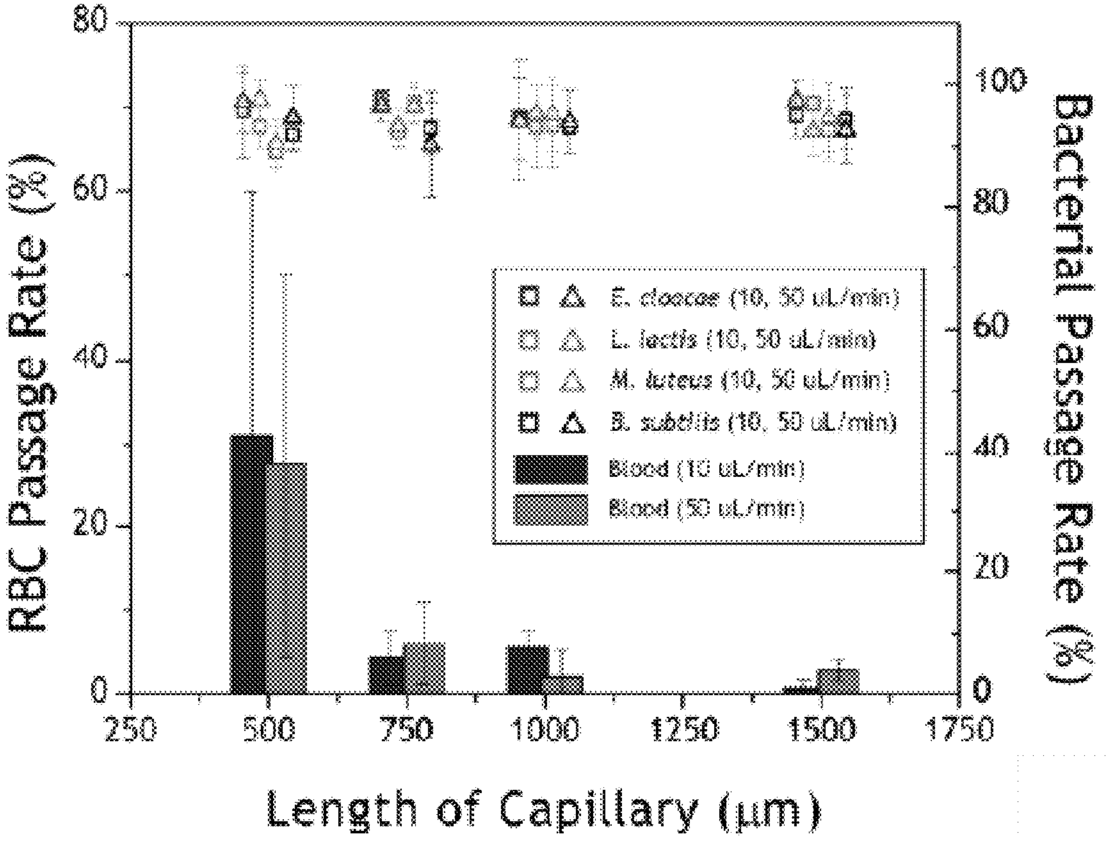
FIG. 12 is a plot showing performance of capillary encased monolithic structure segments with regard to red blood cell and bacterial passage rates based upon changes in segment length and flow rate.

However, even for capillary encased monolith structures having larger pore size distributions in which there are a number of pores greater than 1.2 μm, it has been determined that varying the length of the capillary segment that is secured in the microfluidic chip can influence the lysis efficiency. Referring to FIG. 12, the length of the capillary encased porous monolithic structure segment was varied and tested with solutions flowed through the segments that included RBCs and different bacterial strains (*L. lactis, M luteus, E. cloacae* and *B. subtilis*). The tests were also conducted at two different flow rates (10 μL/min and 50 μL/min). For segment lengths of about 500 μm or less, the RBC passage rate was as large as about 30% at the varying flow rates. However, as segment lengths were increased above 500 μm, the RBC passage rate dropped to about 5% or less (with decreasing RBC passage rate with increasing segment size). The bacterial passage rate for the different strains remained about the same or similar at the different segment lengths and varying flow rates, with passage rates of 90% or greater.

Performance of Porous Monolithic Brick Structures for Isolation of Bacteria within Fluid Samples Monolithic brick structures provide a greater throughput of fluid to be processed through the structures due to the high SA/L ratio provided by such structures. For example, microfluidic chips incorporating the porous monolithic bricks in accordance with the invention are capable of processing >400 μL of whole blood without losing separation efficiency and without exhibiting a significant increase in back pressure while operating at a flow rate of 10 μL/min.

As indicated by the tests conducted for the capillary encased porous monolithic structures, such structures can successfully reduce RBC population to a significant degree (e.g., up to 99% or greater RBCs removed from a fluid) while substantially maintaining intact bacteria within the fluid for further analysis. While lysis efficiency can also be increased by increasing the length of the capillary and monolith encased therein, this can also lead to higher fluidic back pressure required to pump fluid through the monolithic structure (particularly when lysed RBC and/or other matter becomes lodged within pores of the monolithic structure). Passage through monolithic brick structures formed in accordance with the invention can also achieve a high rate of lysis efficiency while maintaining passage of intact bacteria at high flow rates and without significant increase in back pressure (due to the greater SA/L ratio in comparison to the capillary encased monolithic structures). Further, the combination of two or more monolithic brick structures (e.g., incorporated in series or consecutively within the fluid flow path) has been found to further increase the degree of RBC removal from a fluid sample to as much as 99.99% or greater.

Thus, the present invention facilitates the integration of a capillary encased porous monolithic structure and/or a porous monolithic brick structure within a microfluidic chip.

The capillary encased monolithic brick structure is integrated within a chip utilizing one or more thermoplastic clamp structures configured to suitably align or position the monolithic structure within a portion of the chip and further secure the monolithic structure at such suitable alignment or position upon melting and flowing or reflowing/deformation of the clamp structure(s) via the application of heat and/or pressure to the clamp structure(s). During melting and deformation of the clamp structure(s), the clamp structure material flow/reflows around a circumferential or exterior surface portion of the capillary and then solidifies upon cooling to effectively secure the capillary in position as well as provide a fluid tight barrier between a portion of the capillary exterior and the chip such that fluid flowing within a channel of the chip passes through the capillary and monolithic structure disposed within the capillary (i.e., the fluid passes between open ends of the capillary) with substantially no fluid passing around the exterior of the capillary during operation of the microfluidic chip.

The monolithic brick structure is also integrated within a chip and provides a high throughput through the structure due to the high SA/L ratio for fluid flowing through the structure (e.g., SA greater than 1).

The present invention further facilitates the integration of such monolithic structures within one or more microfluidic chips for performing operations to effectively isolate bacterial cells and/or other components from other components (e.g., components that may be larger in size, smaller in size or about the same size as the bacteria of interest). Any combinations of capillary encased monolithic structures with monolithic brick structures can be designed in series and/or parallel flow paths as desired for a particular fluid processing operation. For example, this can facilitate a rapid identification of a particular bacterial strain within a fluid sample.

While the invention has been described in detail and with reference to specific embodiments thereof, it will be apparent to one skilled in the art that various changes and modifications can be made therein without departing from the spirit and scope thereof. For example, Thus, it is intended that the present invention covers the modifications and variations of this invention provided they come within the scope of the appended claims and their equivalents. It is to be understood that terms such as "top", "bottom", "front", "rear", "side", "height", "length", "width", "upper", "lower", "interior", "exterior", and the like as may be used herein, merely describe points of reference and do not limit the present invention to any particular orientation or configuration.

What is claimed:

1. A method of processing a fluid, comprising:

providing the fluid to an inlet of a microfluidic chip; and lysing non-bacterial components while leaving bacterial components intact as the fluid flows through a porous monolithic structure disposed within the microfluidic chip, wherein the porous monolithic structure is provided within a capillary secured within the microfluidic chip via a clamp structure, and the clamp structure surrounds a portion of the capillary to secure and align the capillary with a fluid channel defined within the chip.

2. The method of claim 1, wherein the clamp structure provides a fluid tight barrier between the clamp structure and a portion of the capillary to facilitate flow of fluid through the capillary and prevent flow of fluid around the capillary.

3. A method of processing a fluid, comprising:

providing the fluid to an inlet of a microfluidic chip; and lysing non-bacterial components while leaving bacterial components intact as the fluid flows through a porous monolithic structure disposed within the microfluidic chip, wherein the porous monolithic structure is provided as a brick structure disposed between a first substrate and a second substrate of the microfluidic chip, each of the first and second substrates includes a channel extending through the substrate to the brick structure to provide a fluid flow path through the each of the first substrate, the second substrate and the brick structure.

4. The method of claim 3, wherein the brick structure is dimensioned such that a ratio of flow path area to flow path length through the brick structure is greater than 1.

5. The method of claim 1, wherein the non-bacterial components comprise blood cells.

6. The method of claim 5, wherein the blood cells comprise red blood cells, and a passage rate of red blood cells flowing through the porous monolithic structure is no greater than 5%.

7. The method of claim 1, wherein a passage rate of intact bacterial components flowing through the porous monolithic structure is at least 90%.

8. The method of claim 1, wherein the clamp structure comprises a thermoplastic material.

9. The method of claim 3, wherein the non-bacterial components comprise blood cells.

10. The method of claim 9, wherein the blood cells comprise red blood cells, and a passage rate of red blood cells flowing through the porous monolithic structure is no greater than 5%.

11. The method of claim 3, wherein a passage rate of intact bacterial components flowing through the porous monolithic structure is at least 90%.

12. The method of claim 3, wherein the brick structure comprises silica.

13. A method of processing a fluid, comprising:

providing the fluid to an inlet of a microfluidic chip; and lysing non-bacterial components while leaving bacterial components intact as the fluid flows through a porous monolithic structure disposed within the microfluidic chip, wherein the porous monolithic structure is provided within a protective member, which is secured to the microfluidic chip via at least one clamp structure, the at least one clamp structure securing and aligning the protective member with a fluid channel defined within the microfluidic chip.

14. The method of claim 13, wherein the protective member comprises a tube.

15. The method of claim 13, wherein the protective member comprises silica.

16. The method of claim 13, wherein a material of the protective member is different from a material of the at least one clamp structure.

17. The method of claim 13, wherein the at least one clamp structure provides a fluid tight barrier around the protective member, so as to direct fluid flow through the porous monolithic structure within the protective member.

18. The method of claim 13, wherein the non-bacterial components comprise blood cells.

19. The method of claim 18, wherein the blood cells comprise red blood cells, and a passage rate of red blood cells flowing through the porous monolithic structure is no greater than 5%.

20. The method of claim 13, wherein a passage rate of intact bacterial components flowing through the porous monolithic structure is at least 90%.

21. The method of claim 13, wherein the at least one clamp structure comprises a thermoplastic material.

* * * * *